UNITED STATES PATENT OFFICE.

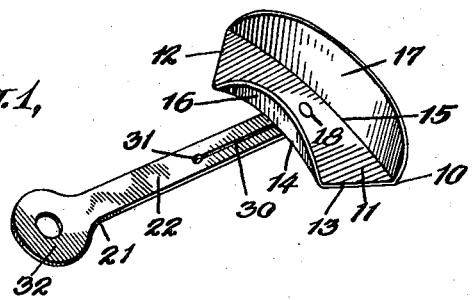
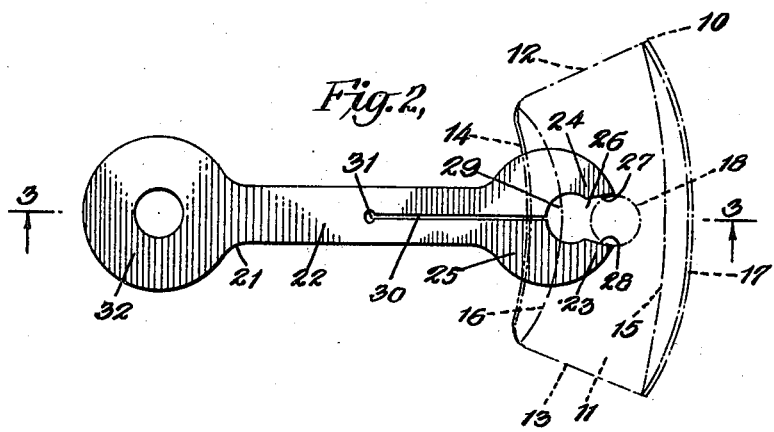
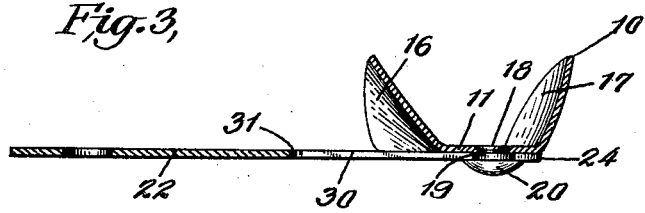

ISIDOR CHIGE, OF NEW YORK, N. Y.

DENTAL-BRIDGE TRAY.

1,323,832.  Specification of Letters Patent.  Patented Dec. 2, 1919.

Application filed January 9, 1919. Serial No. 270,292.

*To all whom it may concern:*

Be it known that I, ISIDOR CHIGE, a citizen of the United States, and a resident of New York, in the county of New York and State of New York, have invented a certain new and useful Improvement in Dental-Bridge Trays, of which the following is a full, clear, and exact specification.

This invention relates to a class of devices adapted to be used in the practice of dentistry.

My invention has for its object primarily to provide a tray or device designed to be employed for taking an impression of one or more teeth of a person whereby a mold may be provided to enable crowns or caps and the like for the teeth to be made, and which is of a form adapted to permit the trough or support of the mold proper to be dispensed with if desired following its use, in order to overcome the liability of affections of the mouth from being transmitted from one person to another. The invention resides mainly in providing a handle element or carrier of yielding material provided with coacting spring actuated clamping jaws for removably receiving the pin of a trough or casing in which is held impression taking material so that the trough with its molding material may be dispensed with after being used. The pin is also revoluble in the clamping jaws of the handle element to allow the trough to be adjusted to suitable positions for obtaining ready access to all parts of a person's mouth, and the trough or casing may be of any preferred or well known type.

A further object of the invention is to provide a dental bridge tray of a simple, efficient and durable construction which may be made in any desired shape and size.

With these and other objects in view, the invention will be hereinafter more particularly described with reference to the accompanying drawing forming a part of this specification in which similar characters of reference indicate corresponding parts in all the views, and will then be pointed out in the claims at the end of the description.

In the drawing, Figure 1 is a perspective view of one form of dental bridge tray embodying my invention.

Fig. 2 is an enlarged top plan of the handle element used in the device with a top plan of the trough being shown in dotted lines, and Fig. 3 is a sectional view, partly in detail, taken on the line 3—3 of Fig. 2.

The device or bridge tray has a trough or casing 10 which may be made in any well known or preferred shape as well as being of any desired size, though I prefer to employ in practice the form of the trough illustrated. This trough or casing has a bottom 11 which may be flat, and the ends of the wall may be formed so as to taper or converge toward each other, as at 12 and 13. One of the lengthwise edges of the bottom 11 of the trough between its tapered ends may be slightly concaved or curved inwardly, as at 14, while the second lengthwise edge of the bottom may be slightly convexed, as at 15. Projecting upwardly from the concaved edge 14 of the bottom 11 of the trough is a wall 16 which is also concaved to conform with the concavity of the edge 14 of the bottom, and the free edge of this wall may be curved in substantially a semi-circular shape, as shown. Extending upwardly from the convex edge 15 of the bottom 11 of the trough is another wall 17 which is slightly convexed, and the free edge of this wall may be curved also in substantially a semi-circular fashion. By forming the trough 10 in this manner it conforms with the curvature of the teeth of a person so that one or more teeth in any part of the mouth may be readily reached and received between the walls 16 and 17 of the trough when disposed accordingly in the mouth. Protruding downwardly from the underside of the bottom of the trough is a lug or pin 18 which is preferably of a form having a short shank 19 with a head 20. The trough or casing 10 may be made of metal or other suitable material to allow of being dispensed with if desired following its use, in order to avoid the possibility of disease of the mouth of one person from being transmitted to another person.

To allow the trough or casing 10 to be conveniently and properly manipulated a handle element or carrier 21 is provided. This handle element may be of any suitable size and shape as well as being made of any desired material, though the handle element is preferably made of spring metal or other yielding material and as illustrated the handle element has a body 22 in the form of a flat strip of somewhat elongated rectangular shape. On one end of the body portion 22 of the handle element are two coacting clamping jaws, as 23 and 24. These jaws are of corresponding formations and may be provided by enlarging one end of the body portion, as at 25. The part of the free edge of this enlarged portion coincident with the center lengthwise of the body of the handle element is notched, at 26. The notch 26 is of a shape having slightly inwardly tapered walls, as 27 and 28, at its mouth, and communicating with the mouth is a partially circular recess, as 29. Communicating with the recess 29 of the notch 26 is a slot, as 30, disposed lengthwise of the body portion of the handle element as well as being of a length to extend nearly midway toward the second end of the body portion, and the second end of the slot may terminate with a communicating hole, as 31, formed through the body portion. On the second end of the body portion 25 of this handle element may be provided a ring, as 32, to allow the device to be conveniently handled by a person and also to allow the handle to be hung on a nail or the like when not in use. The tapered mouth of the notch 26 of the handle element is of a size slightly smaller than the shank 19 of the pin 18 of the trough 10 to cause the pin to be sprung between the clamping jaws 23 and 24 when the trough and the handle element are connected, and the recess 29 of the notch is somewhat larger than the shank of the pin, while the head of the pin is larger than the notch of the recess.

When the trough 10 is applied to the handle element or carrier 21 the pin 18 of the trough is inserted in the notch 26 of the handle element by the shank of the pin being passed through the mouth of the notch and into the recess of the notch. The trough will then be removably clamped to the handle element as well as being rotatably adjustable to allow the trough to be easily disposed in any part of a person's mouth. In practice the trough is filled with plaster Paris or other suitable cementitious material for taking an impression of one or more teeth, and the device is arranged in the mouth of the person as well as being manipulated in the usual manner so that a mold of the teeth will be provided to allow crowns, caps and the like to be made in accordance with the mold. Following the use of the mold the trough together with the mold may be separated from the handle element by withdrawing the pin 18 of the trough from the notch 26 of the handle element, and the trough with the mold may be dispensed with if desired.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In a dental bridge tray, a handle element comprising a flat elongated yielding body portion having a slot extending lengthwise of the body portion and having a notch in one end of the body portion, communicating with one end of the slot whereby spring actuated clamping jaws are provided on the body portion.

2. In a dental bridge tray, a handle element comprising a flat elongated yielding body portion, spring actuated clamping jaws on one end of the body portion, formed by notching one end of the body portion and providing the mouth of the notch with tapered walls as well as providing in the body a slot communicating with the notch, and a ring member on the second end of the body portion.

3. The combination, in a dental bridge tray, of a trough and a handle element comprising a flat elongated yielding body portion having a slot extending lengthwise of the body portion and having a notch in one end of the body portion, communicating with one end of the slot whereby spring actuated clamping jaws are provided on the body portion.

4. The combination, in a dental bridge tray, of a trough, a handle element comprising a flat elongated yielding body portion, spring actuated clamping jaws on one end of the body portion, formed by notching one end of the body portion and providing the mouth of the notch with tapered walls as well as providing in the body a slot communicating with the notch, and a ring member on the second end of the body portion.

This specification signed and witnessed this 8th day of January A. D. 1919.

ISIDOR CHIGE.

Witnesses:
J. FREDERICK CRYER,
K. KOEPER.